United States Patent
Preckel et al.

(10) Patent No.: US 9,365,010 B2
(45) Date of Patent: Jun. 14, 2016

(54) METHOD FOR DIGITALLY PRINTING CONTAINERS AND CONTAINER HAVING AT LEAST ONE PRINT OR PRINTED IMAGE

(75) Inventors: Katrin Preckel, Gelsenkirchen (DE); Martin Schach, Bochum (DE); Markus Reiniger, Monchengladbach (DE)

(73) Assignee: KHS GmbH, Dortmund (DE)

( * ) Notice: Subject to any disclaimer, the term of this patent is extended or adjusted under 35 U.S.C. 154(b) by 635 days.

(21) Appl. No.: 13/819,788

(22) PCT Filed: May 19, 2011

(86) PCT No.: PCT/EP2011/002503
§ 371 (c)(1),
(2), (4) Date: Feb. 28, 2013

(87) PCT Pub. No.: WO2012/028216
PCT Pub. Date: Mar. 8, 2012

(65) Prior Publication Data
US 2013/0157826 A1    Jun. 20, 2013

(30) Foreign Application Priority Data
Sep. 2, 2010 (DE) .......... 10 2010 044 243

(51) Int. Cl.
| | |
|---|---|
| *B41M 5/00* | (2006.01) |
| *B31B 1/74* | (2006.01) |
| *B41M 3/00* | (2006.01) |
| *B31B 1/00* | (2006.01) |
| *B29B 17/02* | (2006.01) |
| *B29L 31/00* | (2006.01) |
| *B29L 9/00* | (2006.01) |
| *B29K 67/00* | (2006.01) |

(52) U.S. Cl.
CPC . *B31B 1/74* (2013.01); *B29B 17/02* (2013.01); *B31B 1/00* (2013.01); *B41M 3/008* (2013.01); *B41M 5/0047* (2013.01); *B41M 5/0064* (2013.01); *B29B 2017/0244* (2013.01); *B29B 2017/0289* (2013.01); *B29K 2067/003* (2013.01); *B29L 2009/005* (2013.01); *B29L 2009/006* (2013.01); *B29L 2031/712* (2013.01); *B29L 2031/722* (2013.01); *B31B 2201/88* (2013.01); *B41M 2205/38* (2013.01); *B41M 2205/40* (2013.01); *B65D 2203/02* (2013.01); *B65D 2565/385* (2013.01); *Y02W 30/524* (2015.05); *Y02W 30/622* (2015.05)

(58) Field of Classification Search
None
See application file for complete search history.

(56) References Cited

U.S. PATENT DOCUMENTS

| | | | | |
|---|---|---|---|---|
| 4,925,705 | A * | 5/1990 | Hill | H05K 3/048 216/13 |
| 5,223,315 | A * | 6/1993 | Katsura | B29C 49/24 156/232 |
| 7,740,924 | B2 * | 6/2010 | Iwasa | B65D 1/0207 206/521 |
| 2007/0157559 | A1 * | 7/2007 | Till | B41J 2/06 53/411 |
| 2010/0096386 | A1 * | 4/2010 | Uptergrove | B41M 5/0017 220/62.11 |

FOREIGN PATENT DOCUMENTS

| | | |
|---|---|---|
| DE | 3687121 | 3/1993 |
| DE | 10 2006001223 | 7/2007 |
| GB | 2242397 | 10/1991 |
| WO | 2010048119 | 4/2010 |

* cited by examiner

*Primary Examiner* — Jill Culler
(74) *Attorney, Agent, or Firm* — Occhiuti & Rohlicek LLP

(57) ABSTRACT

A method for digitally printing on containers by producing a printed multi-colored image on a print layer disposed on a middle layer, the middle layer being one of an intermediate layer and a base layer. The method includes applying the middle layer on an outer surface of a substrate formed by a container wall. An adhesion characteristic between the middle layer and the print layer differs from an adhesion characteristic between the middle layer and the substrate, wherein the adhesion characteristic is selected from the group consisting of adhesion strength and adhesion rate, and wherein the different adhesion characteristics are set by at least one of choice of materials used for the layers and crosslinking of the intermediate layer and the print layer.

17 Claims, 1 Drawing Sheet

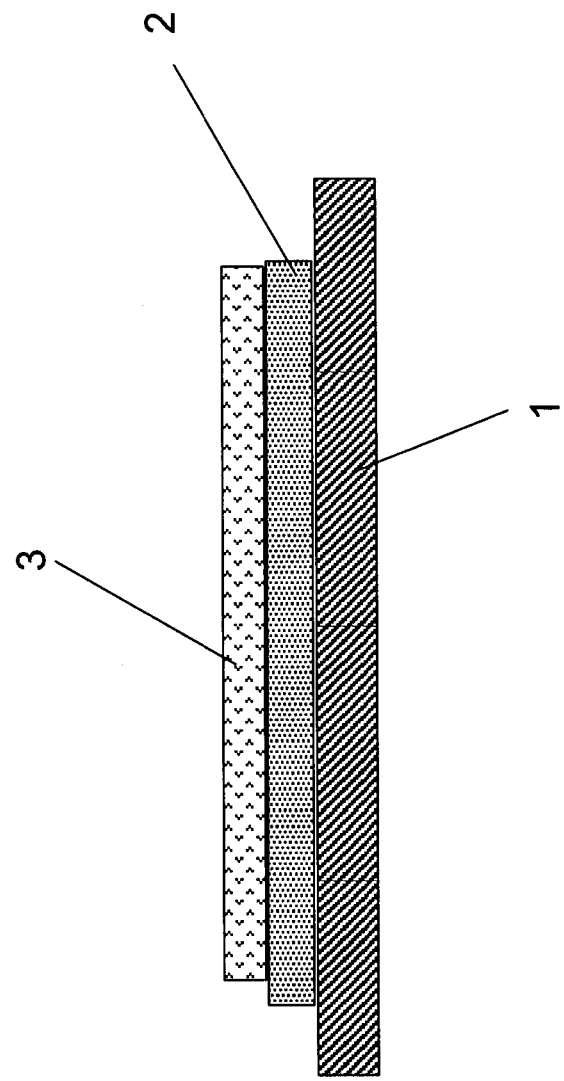

METHOD FOR DIGITALLY PRINTING CONTAINERS AND CONTAINER HAVING AT LEAST ONE PRINT OR PRINTED IMAGE

CROSS REFERENCE TO RELATED APPLICATION

This application is the national phase under 35 USC 371 of international application no. PCT/EP2011/002503, filed May 19, 2011, which claims the benefit of the priority date of German application no. 10 2010 044 243.7, filed Sep. 2, 2010. The contents of the aforementioned applications are incorporated herein in their entirety.

FIELD OF DISCLOSURE

The invention relates to printing on containers.

BACKGROUND

"Containers" in the sense of the invention are in particular cans, bottles, tubes, pouches made of metal, glass and/or plastic, as well as other packaging containers suitable for filling liquid or viscous products for a pressurised filling or for a pressureless filling.

"Printing" in the sense of the invention is to be construed quite generally as the applying of one or more printed images or prints, in particular also multi-colour printed images or prints, to the respective container outer surface and irrespective of the printing method. The printing is carried out preferably using print heads known to the skilled person and working according to the inkjet method, and which are also described in DE 10 2006 001 223 A1. With this method the printing colours or printing inks are applied as fine droplets next to one another and also partly overlapping one another so as to create a multi-colour printed image, specifically in the form of a colour or print layer formed by the printed image or print after the drying or curing of the printing colours. The containers are printed using for example printing colours which are dried or cured by energy input, i.e. heat and/or UV radiation and/or microwave radiation and/or beta radiation and/or electron beams, preferably through crosslinking. This has the disadvantage that the respective print layer cannot be removed from the containers for recycling—or can only be removed with great difficulty—if this layer is otherwise required to display a high adhesion strength during the minimum shelf-life of the filled product and a high resistance to light and weather.

To avoid this disadvantage, a method is also already known (WO 2010/048119) for printing the respective printed image or print layer onto an intermediate or base layer previously applied to the container surface such that an adhesion strength on the container is obtained for the print layer and the intermediate or base layer which is adequate for normal use and for the normal handling of the containers but that for the recycling process the print layer can be detached relatively easily from the container together with the intermediate or base layer. For this it is proposed that the intermediate or base layer is to be also applied in the form of a plurality of at least partly overlapping droplets of the material forming the intermediate or base layer directly onto the container and cured or crosslinked in this form so that the intermediate or base layer only partially adheres to the container outer surface. Such a method is however at the least time-consuming and requires a not inconsiderable design effort and expense.

SUMMARY

It is the task of the invention to disclose a method which avoids the aforesaid disadvantage while still facilitating a trouble-free detaching at least of the print layer from the respective container for the recycling process.

Further embodiments, advantages and possible applications of the invention arise out of the following description of embodiments and out of the figures. All of the described and/or pictorially represented attributes whether alone or in any desired combination are fundamentally the subject matter of the invention independently of their synopsis in the claims or a retroactive application thereof. The content of the claims is also made an integral part of the description.

BRIEF DESCRIPTION OF THE FIGURES

The invention is explained more fully hereinbelow by reference to the FIGURE which depicts in simplified partial representation and in section a substrate 1 formed by a container wall and having direct printing.

DETAILED DESCRIPTION

In the depicted embodiment, substrate 1 is the wall of a plastic container or of a plastic bottle, preferably of a plastic container or of a plastic bottle made from PET. An intermediate or base layer 2 is applied directly to the outer surface of the container wall or of substrate 1. On its surface side facing away from substrate 1 this layer is provided with a colour or print layer 3 which is formed by a multi-colour printed image and which is produced with a suitable printing technique using printing colours or printing inks of different hue, for example using print heads working according to the inkjet method. Specifically, the printed image or print layer 3 comprises a plurality of droplets and/or particles of the printing colours arranged next to one another and/or partly overlapping and which are cured or crosslinked by appropriate treatment, for example by being treated with UV radiation, beta radiation, microwave radiation, heat radiation etc., in particular also in such manner that they form the completely crosslinked colour or print layer 3.

Intermediate or base layer 2 serves among other things to improve the adhesion of the printing colours which are used on the surface that is to be printed and/or to improve the wettability of that surface by the printing colours. It is however also possible in principle to design or select the material for intermediate or base layer 2 in such a way as to significantly enhance the barrier properties of substrate 1 or of a container to gas, in particular to $CO_2$ and/or $O_2$, although then the entire outer surface of substrate 1 or of a container is provided with intermediate or base layer 2. The material that is used for intermediate or base layer 2 may also be designed or selected such that intermediate or base layer 2 at least prevents a migration of the printing colours or their constituents through substrate 1 and hence into the interior of a printed container.

The application of intermediate or base layer 2 can be effected in many different ways, for example by pad printing, flexo printing, digital inkjet printing, by spraying on, by wiping on etc. Intermediate or base layer 2 may also be produced on the substrate by chemical and/or physical reactions, for example by PVD and/or CVD methods or by a silicatising of the outer surface of substrate 1 with a flame pyrolysis method, i.e. with a method in which the outer surface of substrate 1 is flamed as precursor using a burner supplied with a suitable gas, for example with propane and/or butane gas, in the presence of a silicon-organic compound (silane), thereby producing on substrate 1 a very dense amorphous layer of silica as intermediate or base layer 2. This forms a layer which adheres well to substrate 1 and which has high surface tension, so guaranteeing an optimum wetting with the printing colours that are used and consequently an optimum quality of the respective print. If intermediate or base layer 2 consists of a curable plastic material, then the curing or crosslinking of this material is also effected by a suitable energy input, for example by UV radiation, beta radiation, microwave radiation, heat radiation, electron beams etc., in which case if the substrate consists specifically of a transparent material or plastic, for example PET, the curing of intermediate or base layer 2 with the UV radiation is also possible through substrate 1.

UV radiations with longer wavelengths are generally less strongly absorbed by fluids or solids, for example PET, which is why longer-wave UV radiations, in particular in the range from 270 nm into the UV-A range, are recommended when a curing of intermediate or base layer 2 is to be effected through the container wall or through a print layer lying over it. Irrespective of how intermediate or base layer 2 and print layer 3 are actually produced, the layer sequence shown in the FIGURE is executed such that solely because of the materials used and/or their pairing and/or their degree of crosslinking, the adhesion strength or adhesion rates between substrate 1 and intermediate or base layer 2 differ from the adhesion strength or adhesion rates between intermediate or base layer 2 and print layer 3, such that during a recycling process, at least print layer 3 can be detached from the remaining layer sequence, or such that intermediate or base layer 2 together with print layer 3 can be detached from substrate 1 or from the corresponding container, in the manner described more fully below.

EXAMPLE 1

In this embodiment, the adhesion strength between intermediate or base layer 2 and substrate 1 is set higher than the adhesion strength between intermediate or base layer 2 and print layer 3, i.e. the adhesion strength between substrate 1 and intermediate or base layer 2 exhibits for example at least grade "1" according to FINAT test method No. 21, while the adhesion strength between print layer 3 and intermediate or base layer 2 achieves grade "2-3" according to this test method, and at the same time the cohesion or adhesion within print layer 3 is greater than the adhesion of print layer 3 on intermediate or base layer 2 by an appropriate choice and crosslinking of the printing colours or printing inks. The latter is achieved for example in that the crosslinking/cross-adhesion within print layer 3 is greater horizontally, i.e. in axial directions parallel to the surface sides of substrate 1, than the adhesion strength or adhesion rates between intermediate or base layer 2 and print layer 3, preferably at least by a factor of 1.5 to 2. As a result it is then possible to remove print layer 3 from intermediate or base layer 2 without difficulty during the recycling process. Intermediate or base layer 2 is transparent and so can be left on substrate 1 or on the container concerned during recycling.

EXAMPLE 2

In this embodiment the adhesion strengths or adhesion rates are set so that the adhesion strength between intermediate or base layer 2 and substrate 1 achieves grades "2-3" of FINAT test method No. 21, while a much greater adhesion strength, namely an adhesion strength of grade "1" according to FINAT test method No. 21, is achieved for the adhesion of print layer 3 on intermediate or base layer 2.

With this embodiment, print layer 3 together with intermediate or base layer 2 can be removed without difficulty from substrate 1 or from the container concerned during the recycling process. This will also allow the material that is used for intermediate or base layer 2 to be pigmented in colour or opaquely, for example opaque white, without adversely affecting the recycling process or the quality of the recycling material that is obtained by that process and that is again processed into containers. Intermediate or base layer 2 at least is designed such that the cohesion or adhesion within this layer is greater than its adhesion to substrate 1.

The setting of the adhesion strengths and in particular of the adhesion within intermediate or base layer 2 and/or print layer 3 is achieved by the crosslinking/cross adhesion within print layer 3 and/or within intermediate or base layer 2 being greater than the adhesion rates between intermediate or base layer 2 and substrate 1. This makes it possible to separate print layer 3 and at least also partially intermediate or base layer 2 from substrate 1 in the recycling process.

The crosslinking/cross adhesion within print layer 3 is preferably greater than the adhesion rates between intermediate or base layer 2 and substrate 1 and also greater than the adhesion rates between intermediate or base layer 2 and print layer 3, preferentially by at least a factor of 1.5 or 2, whereby a detaching of print layer 3 and an at least partial detaching of intermediate or base layer 2 during the recycling process is achieved.

The curing or drying is effected in a known manner after the application of intermediate or base layer 2 and of print layer 3.

In one variant of the method, intermediate or base layer 2 and print layer 3 are undertaken [sic] in one curing step. Here, intermediate or base layer 2 is cured with long-wave UV radiators, in particular UV radiators which emit UV radiation over 270 nm and longer. The photo-inhibitors of the layers and the power and/or chronological triggering of the UV lamps are matched in such a way that the curing of intermediate or base layer 2 is effected either with a greater power and/or radiation density than that of print layer 3, or the curing of intermediate or base layer 2 with the particularly suitable UV radiation begins chronologically somewhat before the curing of print layer 3.

In a further variant of the method, the radiation is applied from two directions, namely by a radiator arranged radially outward which radiates directly onto print layer 3 in a known manner, and by a radiator arranged in the interior of the container and which acts through the substrate or container wall 1 onto intermediate or base layer 2. In analogue and suitable manner, the radiators exhibit in particular different wavelengths and/or powers, as described above.

The detaching of print layer 3 and/or of intermediate or base layer 2 during the recycling process is generally carried out by mechanical treatment and/or by washing, for example. Typical PET recycling processes for food applications are:

Bühler (Amcor's SuperCycle)
Erema (Vacurema)
URRC (Cleanaway)
Starlinger recoSTAR PET (used by FPR)
Krones B2B (used by Roxanne)
OHL Stehning
Phoenix LNOc.

The recycling material obtained by these processes is re-used to produce containers for food applications, To make it easier to separate the different materials during the recycling process, at least the printing colours which are used possess for example a density which is so much lower than the density of the material or plastic that is to be recycled that the layers detached from substrates 1 (print layer 3 and/or intermediate or base layer 2) float to the surface in a wash solution used during the recycling process and can be easily separated by skimming from the plastic to be recycled or the plastic flakes to be recycled.

A particular adhesion strength between substrate 1 and intermediate or base layer 2 can also be achieved in that a crosslinking of intermediate or base layer 2 can be effected through the substrate, in particular if the material for substrate 1 is transparent.

Especially when intermediate or base layer 2 consists of a layer of silica, the printing colours are configured such that the cohesion or adhesion within print layer 3 is greater than the adhesion of print layer 3 on intermediate or base layer 2. During recycling, after the detaching of print layer 3, the latter can remain on substrate 1 which consists of plastic, without the recycled plastic being noticeably altered thereby in optical and/or physical properties. The layer of silica may be produced or deposited by either flame pyrolysis or by other PVD and CVD methods.

The invention has been described hereinbefore by reference to embodiments. It goes without saying that numerous variations as well as modifications are possible without departing from the inventive concept underlying the invention.

REFERENCE LIST

1 Substrate or container wall
2 Intermediate or base layer
3 Printed image or print layer

The invention claimed is:

1. A method for digitally printing on containers by producing a printed multi-colored image on a print layer disposed on a middle layer, said middle layer being one of an intermediate layer and a base layer, said method comprising applying said middle layer on an outer surface of a substrate formed by a container wall of said container, wherein an adhesion characteristic between said middle layer and said print layer differs from an adhesion characteristic between said middle layer and said substrate, wherein said adhesion characteristic is selected from the group consisting of adhesion strength and adhesion rate, and wherein said different adhesion characteristics are set by at least one of choice of materials used for said layers and crosslinking of said intermediate layer and said print layer, wherein said adhesion characteristics are set such that said adhesion characteristic between said middle layer and said substrate is greater than said adhesion characteristic between said middle layer and said print layer, wherein an inner adhesion of said print layer exceeds said adhesion characteristic between said middle layer and said print layer, wherein said adhesion characteristic between said middle layer and said substrate is consistent with grade "1" of FINAT test method number 21, as detailed in the 7$^{th}$ Edition of the FINAT Technical Handbook published in 2005, and said adhesion characteristic between said print layer and said middle layer is consistent with grades "2-3" of said FINAT test method number 21.

2. A method for digitally printing on containers by producing a printed multi-colored image on a print layer disposed on a middle layer, said middle layer being one of an intermediate layer and a base layer, said method comprising applying said middle layer on an outer surface of a substrate formed by a container wall of said container, wherein an adhesion characteristic between said middle layer and said print layer differs from an adhesion characteristic between said middle layer and said substrate, wherein said adhesion characteristic is selected from the group consisting of adhesion strength and adhesion rate, and wherein said different adhesion characteristics are set by at least one of choice of materials used for said layers and crosslinking of said intermediate layer and said print layer, wherein said adhesion characteristics are set such that said adhesion characteristic between said middle layer and said substrate is less than said adhesion characteristic between said print layer and said middle layer, and wherein at least one of said middle layer and said print layer has an inner adhesion that is greater than said adhesion characteristic between said middle layer and said substrate.

3. The method of claim 2, wherein crosslinking/cross adhesion within said print layer is greater than said adhesion characteristic between said print layer and said middle layer at least by a factor of 1.5-2.

4. The method of claim 2, wherein at least one layer selected from said print layer and said middle layer is crosslinked in such a way that crosslinking/cross adhesion within said at least one layer is greater than said adhesion characteristic between said middle layer and said substrate.

5. The method of claim 2, wherein said middle layer and said print layer are cross-linked such that crosslinking/cross adhesion within said print layer exceeds said adhesion characteristic between said middle layer and said substrate, and such that said crosslinking/cross adhesion within said print layer also exceeds said adhesion characteristic between said print layer and said middle layer at least by a factor of 1.5-2.

6. The method of claim 2, wherein a layer selected from said print layer and said middle layer comprises a material that can be cross-linked by energy input, wherein said energy input comprises at least one of ultraviolet radiation, beta radiation, electron radiation, microwave radiation, and heat radiation.

7. The method of claim 2, wherein said middle layer is produced by one of mechanical application, chemical reaction, physical reaction, chemical deposition, physical deposition, and silicatizing with flame pyrolysis.

8. The method of claim 2, further comprising selecting said middle layer to include a material that acts as a gas barrier.

9. The method of claim 2, further comprising selecting said middle layer to include a material that prevents migration of color through said substrate during production of said printed image.

10. The method of claim 2, wherein said substrate is formed by a transparent container wall of a container, said method further comprising effecting cross-linking of said middle layer through energy input through said substrate.

11. A manufacture comprising a container having a multi-color printed image produced on a print layer by digital printing onto a middle layer that is applied to an outer surface of a substrate formed by a container wall of said container, wherein said middle layer comprises one of an intermediate layer and a base layer, wherein an adhesion characteristic is selected from the group consisting of adhesion strength and adhesion rate, wherein a first adhesion characteristic, which is an adhesion characteristic between said substrate and said middle layer, differs from a second adhesion characteristic, which is an adhesion characteristic between said middle layer and said print layer, wherein said different first and second adhesion characteristics are set by a choice of one of materials used for said layers and cross-linking of said middle layer and said print layer, wherein said adhesion characteristics are set such that said first adhesion characteristic is greater than said second adhesion characteristic, wherein an inner adhesion of said print layer exceeds said second adhesion characteristic, wherein said first adhesion characteristic is consistent with grade "I" of FINAT test method No. 21, as detailed in the 7$^{th}$ Edition of the FINAT Technical Handbook published in 2005, and wherein said second adhesion characteristic is consistent with "2-3" of said FINAT test method No. 21.

12. A manufacture comprising a container having a multi-color printed image produced on a print layer by digital printing onto a middle layer that is applied to an outer surface of a substrate formed by a container wall of said container, wherein said middle layer comprises one of an intermediate layer and a base layer, wherein an adhesion characteristic is selected from the group consisting of adhesion strength and adhesion rate, wherein a first adhesion characteristic, which is an adhesion characteristic between said substrate and said middle layer, differs from a second adhesion characteristic, which is an adhesion characteristic between said middle layer and said print layer, wherein said different first and second adhesion characteristics are set by a choice of one of materials used for said layers and cross-linking of said middle layer and said print layer, wherein said first and second adhesion characteristics are set such that said first adhesion characteristic is less than said second adhesion characteristic, and wherein at least one of said middle layer and said print layer has an inner adhesion that is greater than said first adhesion characteristic.

13. The manufacture of claim 12, wherein a cross-linking/cross-adhesion within said print layer exceeds said second adhesion characteristic.

14. A manufacture according to claim 12, wherein a layer selected from the group consisting of said print layer and said middle layer is cross-linked in such a way that cross-linking/cross-adhesion within said layer exceeds said first adhesion characteristic.

15. The manufacture of claim 12, wherein said middle layer and said print layer are cross-linked in such a way that cross-linking/cross-adhesion within said print layer exceeds said first adhesion characteristic and exceeds said second adhesion characteristic by at least a factor of 1.5-2.

16. The manufacture of claim 12, wherein said middle layer comprises a material that exhibits barrier properties against at least one of carbon dioxide and oxygen gas.

17. The manufacture of claim 12, wherein said middle layer comprises a material that prevents migration of color through said substrate during production of said printed image.

* * * * *